No. 795,031. PATENTED JULY 18, 1905.
J. B. & C. B. EBLING.
FERTILIZER SOWER.
APPLICATION FILED MAY 5, 1905.
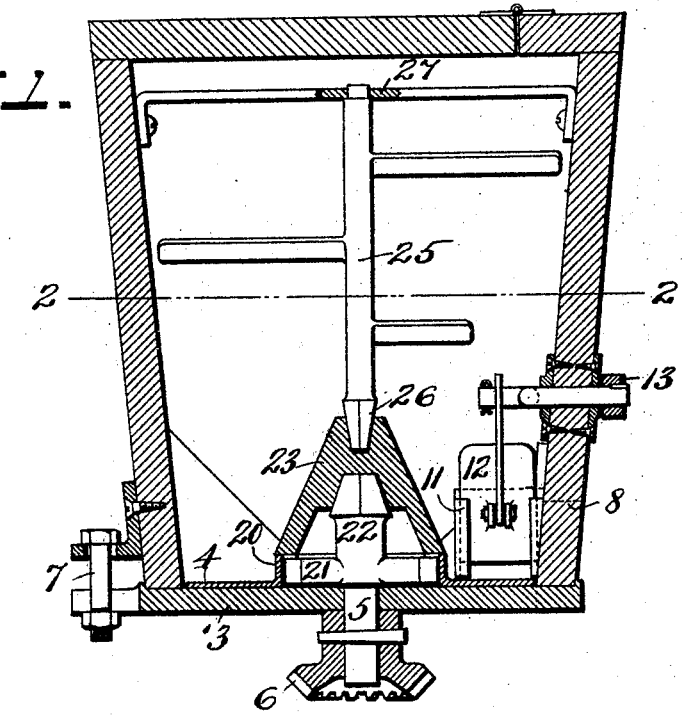
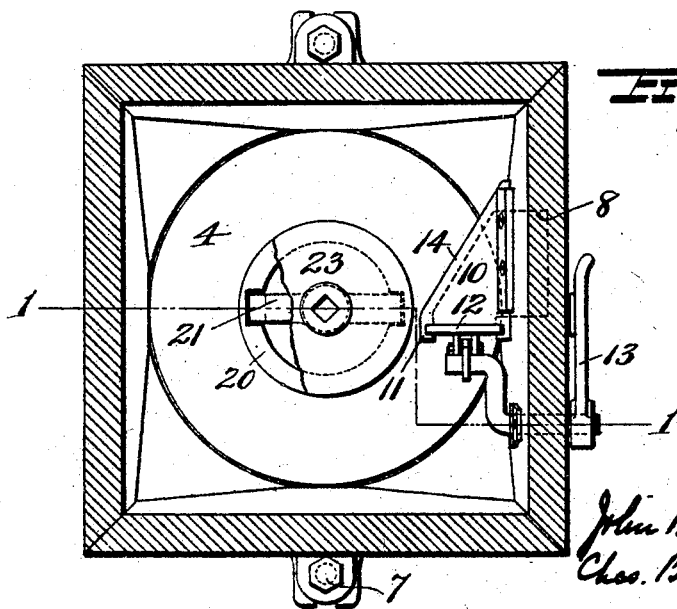

No. 795,031.  Patented July 18, 1905.

UNITED STATES PATENT OFFICE.

JOHN B. EBLING, OF TUCKERTON, AND CHARLES B. EBLING, OF DAUBERVILLE, PENNSYLVANIA.

FERTILIZER-SOWER.

SPECIFICATION forming part of Letters Patent No. 795,031, dated July 18, 1905.

Application filed May 5, 1905. Serial No. 258,924.

*To all whom it may concern:*

Be it known that we, JOHN B. EBLING, of Tuckerton, and CHARLES B. EBLING, of Dauberville, in the county of Berks and State of Pennsylvania, citizens of the United States, have invented certain new and useful Improvements in Fertilizer-Sowers, of which the following is a specification.

This invention relates to that class of distributers in which the hopper or box for holding the material is provided with a bottom comprising one or more rotatable plates or disks adapted by its rotation to deliver the material to a suitable discharge-outlet.

The invention consists in the improved construction whereby the material is delivered in regulated quantity from the upper surface of the rotating plate to an outlet in the hopper-box wall located beyond the periphery of the rotary carrier-plate and in the improved manner of mounting the rotating parts, as fully described in connection with the accompanying drawings and specifically pointed out in the claims.

Figure 1 is a sectional elevation, taken on the line 1 1 of Fig. 2, of a fertilizer-distributer embodying the improvements. Fig. 2 is a sectional plan view on the line 2 2 of Fig. 1, a portion of the conical cap being broken away to show the engagement of the vertical drive-shaft with the rotary plate.

The fixed bottom plate 3 of the fertilizer-receptacle may be mounted upon any suitable frame—as, for instance, upon a corn-planter—in connection with which the distributer may be employed. Upon this fixed bottom plate the rotary plate or disk 4 is carried, and rotary movement is imparted to said plate by means of a vertical drive-shaft 5, provided at its lower end with a gear 6, which is arranged in mesh with any suitable driving mechanism. (Not shown.) The rectangular walls of the hopper are removably bolted, as indicated at 7, to the fixed bottom 3, each wall lying outside the periphery or rim of the rotary distributing-plate 4. One of these side walls is provided with a discharge opening or outlet 8, extending upward from the fixed bottom 3 and suitably arranged to permit the dropping of the fertilizer material therefrom. Secured to the inner face of this wall of the hopper-box, so as to guard the opening 8, is an inverted triangular box 10, the open bottom of which overhangs the rotary distributing-plate 4. The overlapping end 11 of this triangular box, which stands at approximately right angles to the hopper-wall, is adjustably closed by a vertically-movable gate 12, guided in suitable grooves, said gate being operated, as shown, by a lever 13, whereby it is held at any desired height to regulate the amount of material passed therethrough on the rotary bottom plate to the box 10, which latter thus forms a vestibule to the hopper-outlet 8. The material thus admitted to the triangular box 10 is swept off from the passing surface of the rotary plate by the diagonal wall 14 of the inverted box 10 and is discharged through the hopper-outlet 8.

The upper surface of the rotary distributing-plate 4 is provided at the center with a circular raised portion 20, formed with a depressed cross-groove in which the cross-arm 21 of the vertical drive-shaft 5 is seated, so as to cause the rotation of the plate with the shaft. Upon an upward extension 22 of the latter is loosely mounted a conical cap 23, which is socketed to engage the angular head of the shaft and the circular lower edge of which bears upon the central portion 20 of the plate 4. This cap thus serves to cover the shaft with which it is rotated and to loosen and deflect the fertilizer material onto the flat carrying-surface of the rotary plate. It is further utilized also, as shown, to carry and rotate a stirrer device 25, which has its angular lower end 26 engaged in a corresponding recess in the cap and its upper end held in a fixed bearing 27. Thus the separate parts are very readily formed and assembled, while the operation is positive and effective, the material being constantly maintained in loose feeding condition and the regulated discharge through the triangular box and communicating outlet in the hopper being uniform and reliable.

What we claim is—

1. In a fertilizer-distributer the combination with a rotary distributing-plate, of a hopper-box the walls of which lie beyond the periphery of said rotary plate and are provided with a lateral discharge-outlet and the inverted-triangular-box vestibule thereto extending over said plate and having a vertically-adjustable end gate thereto whereby a variable layer of material is delivered from the rotary plate to said vestibule and discharge-outlet, substantially as set forth.

2. In a fertilizer-distributer the combination with a rotary distributing-plate having a concentric raised portion inclosing shaft-engaging grooves, and a hopper-box having a discharge-outlet in the wall thereof and a vestibule extension over said rotary plate, of the vertical drive-shaft having a cross-arm engaging said grooves and the conical deflector-cap bearing upon said concentric raised portion substantially as set forth.

3. In a fertilizer-distributer the combination with the hopper-box having discharge-controlling means, of the rotary distributing-plate arranged to deliver the material to said discharge means, the cross-shaped drive-shaft for said plate, the conical deflector-cap carried by said shaft, and the stirrer-shaft carried by said cap, substantially as set forth.

In testimony whereof we affix our signatures in the presene of two witnesses.

JOHN B. EBLING.
CHARLES B. EBLING.

Witnesses:
ELIZABETH H. RAHN,
ISAAC H. RAHN.